(No Model.)  2 Sheets—Sheet 2.
G. H. EVANS, Jr.
CORN PLANTER.
No. 411,282.   Patented Sept. 17, 1889.
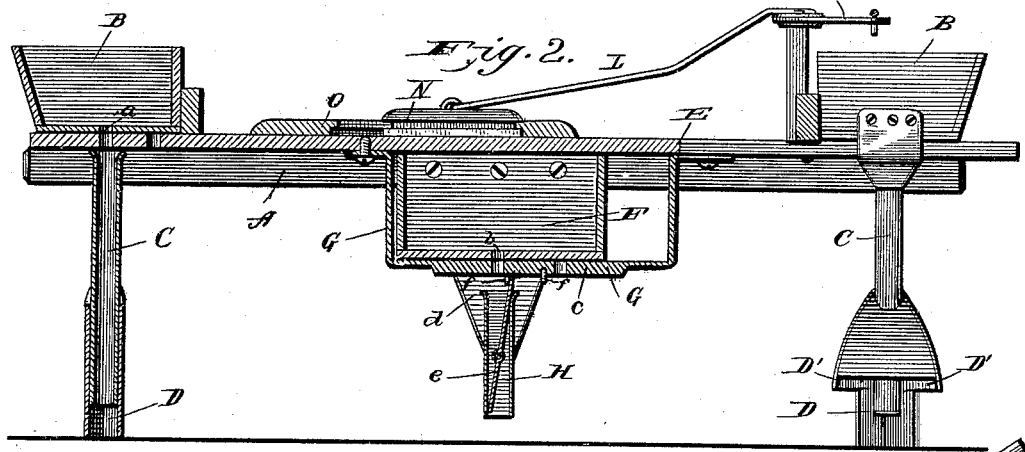
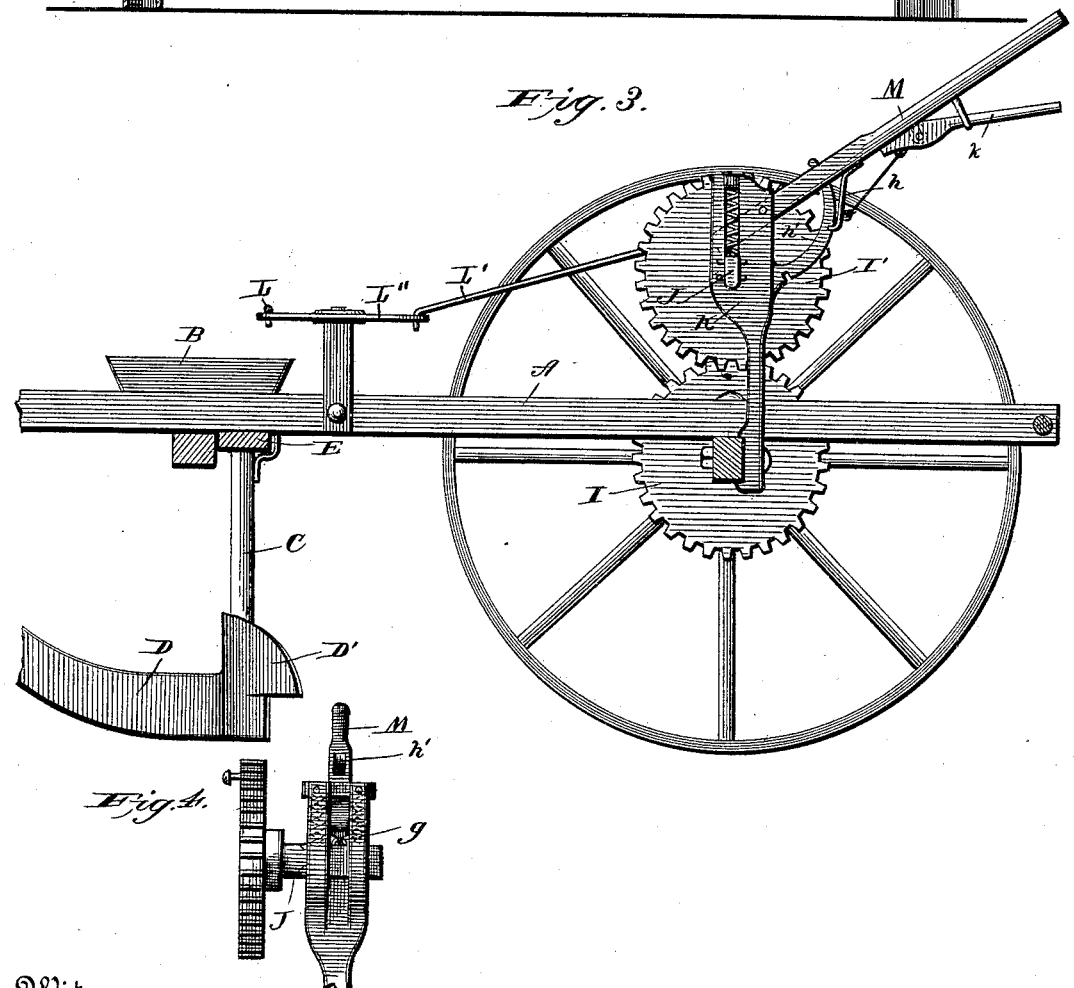
Witnesses  Inventor

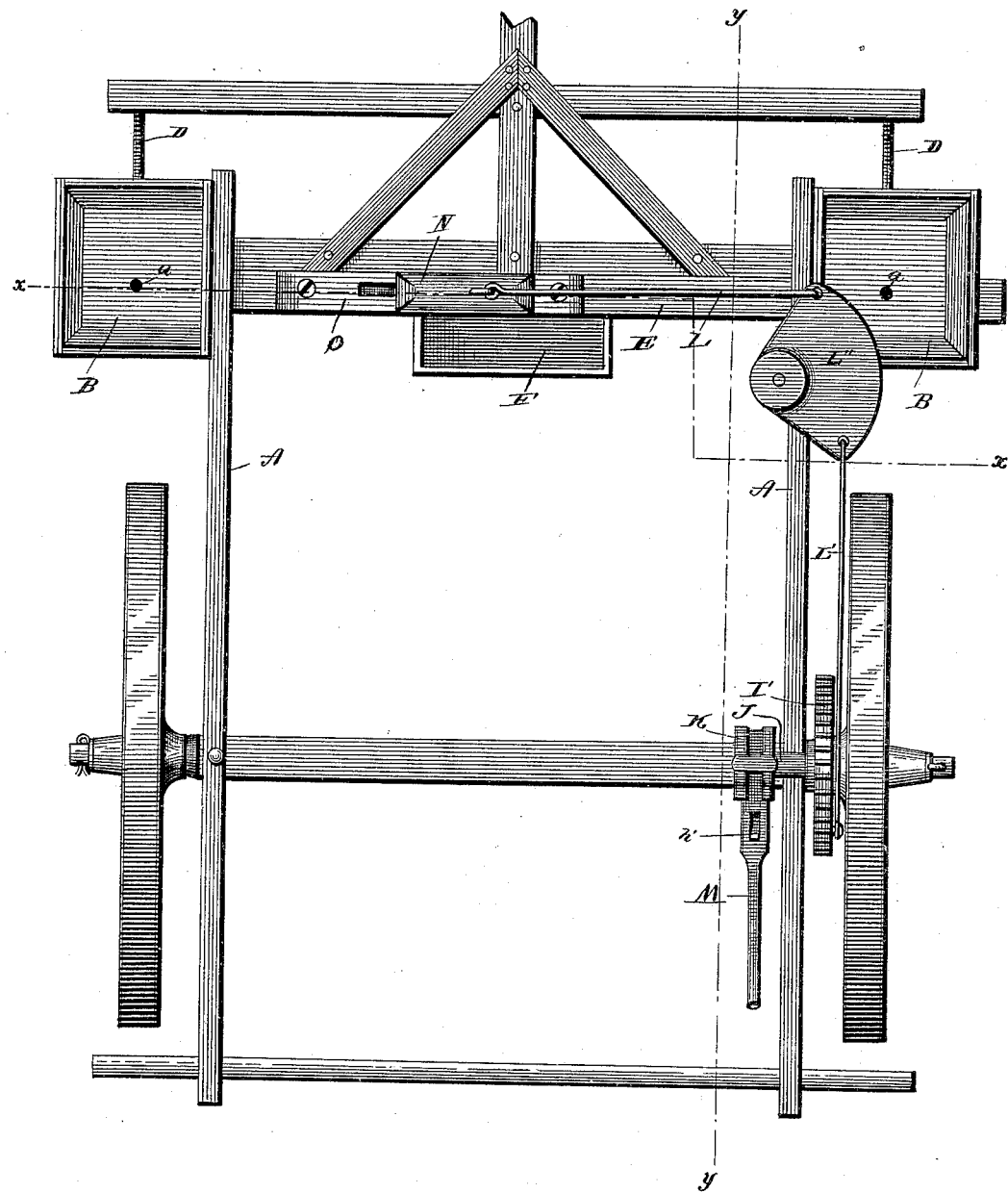

UNITED STATES PATENT OFFICE.

GEORGE HENRY EVANS, JR., OF INDEPENDENCE, KANSAS.

CORN-PLANTER.

SPECIFICATION forming part of Letters Patent No. 411,282, dated September 17, 1889.

Application filed May 21, 1889. Serial No. 311,587. (No model.)

*To all whom it may concern:*

Be it known that I, GEORGE HENRY EVANS, Jr., a citizen of the United States, residing at Independence, in the county of Montgomery and State of Kansas, have invented certain new and useful Improvements in Attachments for Corn-Planters, of which the following is a specification, reference being had therein to the accompanying drawings, in which—

Figure 1 represents a plan view of my improvements applied to a corn-planter of suitable construction; Fig. 2, a vertical sectional view taken on the line $x$ $x$ of Fig. 1; Fig. 3, a similar view taken on the line $y$ $y$ of Fig. 1; Fig. 4, a detail view of the spring-actuated driving-pinion.

My invention has for its object to provide a planter of any ordinary or improved construction with extremely simple means for automatically indicating the exact location of each hill of seed without employing wires or other analogous devices, as will be more fully hereinafter set forth.

In the accompanying drawings, the letter A designates the frame of the planter, which is mounted upon suitable wheels and provided with a tongue or pole. Secured upon the frame directly in front of the transporting-wheels are the seed-hoppers B, each of which is provided with an aperture $a$ in its bottom for the passage of the corn. Secured to the frame immediately below the apertures $a$ in the seed-hopper are the seed-spouts C, which terminate near the ground and immediately behind the rear bifurcated ends of the shoes or runners D. The shoes D are each provided with a pair of laterally-spreading wings D', which serve to remove the large clods from in front of the wheels of the machine as the same advances.

The seed-slide E is adapted to reciprocate beneath the hoppers, immediately above the upper ends of the seed-spouts, and is provided at each of its ends with two vertical seed-apertures formed a short distance from each other, and adapted to alternately register with the seed-apertures of the hopper and let out a suitable amount of seed, as is usual.

Secured to the frame A below the seed-slide about midway between the seed-hoppers is a suitable box or receptacle F, adapted to contain some suitable marking material, such as salt, lime, or other white substance. In the bottom of this box is formed a hole $b$ for the passage of the powdered marking material. Attached to the seed-slide and embracing the box F is a yoke G, the lower horizontal portion $c$ of which fits against the bottom of the said box. This bar $c$ is provided with two holes, which are formed the same distance apart as the seed-openings in the seed-slide, and adapted to alternately register with the opening in the bottom of the box F and let out a small quantity of the marking material every time the corn is dropped from the hoppers, thus automatically indicating to the driver the location of the hills of corn.

Secured to a hanger $d$, attached to the box F, is a tube H, which is located directly beneath the opening in the said box, so as to receive the discharge of the marking material. Pivoted in this tube is a vertical plate $e$, the upper end of which projects above the upper end of the tube, and is engaged by two pins $f$ upon the bar $c$, these pins being set between the holes in the said bar $c$. It will be observed that when the seed-slide is reciprocated the pins $f$ will alternately throw the pivoted plate $e$ from one side to the other of the tube and drop the accumulated marking material in a heap upon the ground. This device for dropping the material in a concentrated mass upon the ground may or may not be employed, as the exigencies of the case may require.

Secured upon one of the transporting-wheels is a cog-wheel I, which engages the teeth of another cog-wheel I', journaled upon a short shaft J, this shaft being mounted in a slotted standard K, secured upon the axle. This cog-wheel I' is connected by means of rods L L' and a pivoted segment or lever L" to the seed-slide, and is adapted to reciprocate the same. To throw the pinion I' out of engagement with the driving gear-wheel, I employ a lever M, and pivot the same in a slot in the upper end of the standard K, the forward end of this lever being pivotally connected to the shaft J at $g$. To hold the lever in either of its adjusted positions, I employ a spring-catch $h$, which engages a notched segment $h'$, secured to the standard K, this catch being operated by means of a small lever k, pivoted near the end of the said lever M.

The end of the rod L is pivotally connected to a sliding block N, secured upon the upper side of the seed-slide by means of a slotted plate O, the slot in this plate being somewhat longer than the said block N to allow the latter a slight movement independent of the slide. The object in thus permitting the block N to move independently of the attached slide at the beginning of each stroke of the same is to permit the slide to come to a short rest at the end of each stroke, so as to give the corn and marking material time to drop through their respective apertures.

By means of my simple marking attachment all expensive and troublesome check-row wires and other complicated apparatus are obviated.

If desired, some fertilizing material may be employed as a marking material.

Having thus fully described my invention, what I claim, and desire to secure by Letters Patent, is—

1. The combination of the frame and hoppers, the seed-slide provided with seed-apertures and adapted to work under said hoppers, a slotted plate O, secured upon the seed-slide, a sliding flanged block N, secured to the seed-slide by means of the said plate O, this block N being shorter than the slot in which it works, a rod connected to this block N, and means for operating this rod, substantially as described.

2. The combination of a frame and seed-hoppers, a seed-slide, a hopper F, yoke G, working under this hopper and secured to seed-slide and apertured, as described, the projections f upon this yoke, a pivoted plate e, the upper end of which works between the projections f, and a tube H, inclosing the said pivoted plate, as and for the purposes described.

In testimony whereof I affix my signature in presence of two witnesses.

GEORGE HENRY EVANS, Jr.

Witnesses:
  M. F. WOOD,
  H. W. CONRAD.